United States Patent
Joshi et al.

(10) Patent No.: US 11,743,693 B2
(45) Date of Patent: Aug. 29, 2023

(54) SEAMLESS MOBILITY FOR CLIENTS RECEIVING MULTICAST TRAFFIC

(71) Applicant: HEWLETT PACKARD ENTERPRISE DEVELOPMENT LP, Houston, TX (US)

(72) Inventors: Vinayak Joshi, Bangalore (IN); Tathagata Nandy, Bangalore (IN); Venkatavaradhan Devarajan, Bangalore (IN); Saumya Dikshit, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/374,422

(22) Filed: Jul. 13, 2021

(65) Prior Publication Data

US 2023/0024996 A1   Jan. 26, 2023

(51) Int. Cl.
| | |
|---|---|
| *H04W 4/08* | (2009.01) |
| *H04W 36/18* | (2009.01) |
| *H04L 45/00* | (2022.01) |
| *H04L 45/16* | (2022.01) |
| *H04L 12/18* | (2006.01) |
| *H04W 84/12* | (2009.01) |
| *H04W 88/08* | (2009.01) |

(52) U.S. Cl.
CPC .............. *H04W 4/08* (2013.01); *H04L 45/16* (2013.01); *H04L 45/66* (2013.01); *H04W 36/18* (2013.01); *H04L 12/189* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 7,613,150 B2 | 11/2009 | Nagarajan et al. | |
| 7,639,648 B2 | 12/2009 | Nagarajan et al. | |
| 7,885,233 B2 | 2/2011 | Nagarajan et al. | |
| 7,916,682 B2 | 3/2011 | Nagarajan et al. | |
| 8,427,938 B2 | 4/2013 | Atreya | |
| 8,428,006 B2 | 4/2013 | Jain et al. | |
| 8,520,595 B2 | 8/2013 | Yadav et al. | |
| 2007/0064673 A1 | 3/2007 | Bhandaru et al. | |
| 2007/0153741 A1* | 7/2007 | Blanchette | H04W 8/02 370/331 |

(Continued)

*Primary Examiner* — Anh Ngoc M Nguyen
(74) *Attorney, Agent, or Firm* — Hewlett Packard Enterprise Patent Department (57) ABSTRACT

In an example, a wired network device receives a first join message originating from a client device associated with a first wireless access point (WAP) connected to another wired network device in a broadcast domain. An entry corresponding to the client device is created in a remote receiver record of the wired network device. In response to the client device transitioning from the first WAP to a second WAP connected to the wired network device, it is determined that the client device is locally connected to the wired network device. Intention of the client device to receive multicast traffic is identified. A second join message directed to the network address of the multicast group and distributed in the broadcast domain. A traffic flow path for the multicast traffic via the wired network device and the second WAP to the client device is configured.

20 Claims, 4 Drawing Sheets

(56) References Cited

U.S. PATENT DOCUMENTS

| | | | |
|---|---|---|---|
| 2008/0020758 A1 | 1/2008 | Nagarajan et al. | |
| 2010/0293043 A1* | 11/2010 | Atreya | G06F 11/2023 |
| | | | 714/E11.073 |
| 2011/0004913 A1 | 1/2011 | Nagarajan et al. | |
| 2012/0243457 A1* | 9/2012 | Narasimhan | H04L 12/185 |
| | | | 370/312 |

* cited by examiner

202 — Receiving a first join message originating from a client device, wherein the client device is associated with a first wireless access point (WAP) connected to another wired network device from a plurality of network devices in a broadcast domain, wherein the wired network device is in the broadcast domain and the first join message is forwarded on the broadcast domain by the other wired network device, wherein the first join message is indicative of a request of the client device to join a multicast group

204 — Creating, based on the first join message, an entry corresponding to the client device in a remote receiver record of the wired network device, wherein the entry is indicative of an intent of the client device to join the multicast group, the entry including a network identifier of the broadcast domain, a network address of the client device, and a media access control (MAC) address of the client device linked to a network address of the multicast group

206 — In response to the client device transitioning from the first WAP to a second WAP connected to the wired network device, searching the remote receiver record using the network identifier of the broadcast domain and the MAC address of the client device

208 — Identifying, based on the search, that the client device on the broadcast domain intends to receive multicast traffic of the multicast group

210 — Generating, based on the network address of the client device, a second join message directed to the network address of the multicast group

212 — Distributing the second join message to the plurality of wired network devices in the broadcast domain

214 — Configuring, based on the second join message, a traffic flow path for the multicast traffic of the multicast group via the wired network device and the second WAP to the client device.

SEAMLESS MOBILITY FOR CLIENTS RECEIVING MULTICAST TRAFFIC

BACKGROUND

In a networking topology of communication networks, a network device, such as a switch, may be connected to another switch through a physical link. Different network devices may be connected for the purpose of communication. Wired network devices, such as switches, may be connected over a local area network (LAN). A collection of LANs may form an access layer of a network. Wired network devices in the access layer may be connected to one or more Wireless Access Points (WAPs). The WAPs may serve mobile client devices.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIG. 2 is a flowchart illustrating a method for handling multicast traffic delivery to a client device roaming across WAPs, according to an example;

Certain examples have features that are in addition to or in lieu of the features illustrated in the above-referenced figures. Certain labels may be omitted from certain figures for the sake of clarity.

DETAILED DESCRIPTION

Communication networks are often segregated into three layers, i.e., a core layer, a distribution layer, and an access layer. The core layer provides high-speed communication capability to network devices located in the distribution and access layers. In such communication networks, client devices are provided with the communication capability by the access layer. The distribution layer acts as an interface between the core layer and the access layer and manages routing, filtering, and quality of service (QoS) policies of the communication network. For the sake of explanation, the switches providing communication capabilities at the access layer have been referred to as access switches and the switches providing communication capabilities at the distribution layer have been referred to as access switches.

Communication network deployments, such as campus area networks (CANs), may include an interconnection of local area networks (LANs) and wireless access points (WAPs) connected to network devices in the LANs. Examples of the network devices include switches, routers, gateways, etc. In some examples, the LAN may include an interconnection of access switches. The access switches may be connected to WAPs over physical links and may function as network attachment points for the WAPs. An access switch may be connected to one WAP or more than one WAP. Each WAP may serve wireless client devices, such as laptops and cell phones, within a specific range, for example in a particular floor of a building, where the CAN is deployed. A client device moving between different floors of the building may transition or roam between WAPs serving the different floors to maintain connectivity. In some examples, the WAPs may be configured in a distributed Wireless LAN (WLAN) deployment. In a distributed WLAN deployment multiple WAPs may function in co-operation with each other using a collection of cooperative protocols, without requiring a centrally managed WLAN controller. Individual WAPs in a distributed WLAN environment may provide independent distributed intelligence but work together as a system to cooperatively provide control mechanisms.

When client devices roam across WAPs, different roaming techniques may be used by the WAPs to authenticate and associate with the client devices. These roaming techniques allow a wireless client device to communicate continuously while moving freely throughout an area greater than that covered by a single WAP. In some examples, a client device may roam across WAPs that are connected to different access switches, i.e., different network attachment points. For distributed WLAN deployments, wireless client locations are updated in each WAP so that the access switches may forward traffic to appropriate client devices. This enables connectivity for client devices roaming across different WAPs connected to different access switches. Generally, wireless client locations are updated in each WAP using source Media Access Control (MAC) learning based location update among the access switches.

Consider that a client device is a receiver of unicast traffic and is served by a first WAP connected to a first access switch. Unicast refers to a one-to-one transmission from one point in the network to another point, that is, a single sender and a single receiver, each identified by a network address. The client device may roam across and transition from the first WAP to a second WAP connected to a second access switch. The first and second access switches may form an access layer of a network and may be connected over LAN. In some examples, when the client device transitions to the second WAP, a data packet from the client device arriving at the second access switch may trigger source MAC learning and MAC move procedures in the second access switch, whereby the second access switch may update its forwarding tables indicating that the client device is now reachable on a particular port of the second access switch. Similarly, all layer 2 switches in the access layer may update their forwarding tables indicating that the client device is reachable on a particular port of the second access switch. In some other examples, if the client device does not have a data packet to originate, the second access switch may send a broadcast request, such as a Gratuitous Address Resolution Protocol (ARP) message on behalf of the client device using the client device's MAC address as the source MAC.

ARP is a communication protocol used for discovering the link layer address, such as a MAC address, associated with a given internet layer address, typically an IPv4 address. Thus, ARP provides a mapping between an IP address and a MAC address. Gratuitous ARP is generally used by a TCP/IP device to inform other devices in a Local Area Network (LAN) about any change in its MAC address or IPv4 address. A Gratuitous ARP is an ARP message broadcasted to devices over a LAN, in which the source and destination MAC addresses are the same. Since the destination MAC address is identical to the source MAC address, the switch generating the Gratuitous ARP floods the Gratuitous ARP packet to all its connected ports. Thus, on receiving the Gratuitous ARP, the first access switch connected to the second access switch over LAN may be aware that the client device is now reachable on the second access switch. Since, the switches in the access layer become aware that the client device is now reachable on the second access switch, flow path of the unicast traffic is configured through the second access switch and the second WAP to the client device. Thus, source MAC learning as discussed above, may quickly re-establish unicast paths for wireless client devices roaming from one WAP to another connected to different access switches.

However, source MAC learning may not enable seamless mobility when mobile wireless client devices are receiving multicast traffic, as described hereinafter. Multicast is a group communication protocol where data transmission is addressed to a group of destination devices simultaneously. The group to which the data traffic is destined may be referred to as a multicast group. The multicast group may include host devices, such as wireless clients, which are the receivers of the multicast traffic. The multicast group may be allotted an IP address. Consider that a client device receiving multicast traffic transitions from the first WAP connected to the first access switch to the second WAP connected to the second access switch. In such case, the multicast path in the second access switch may not be updated immediately after the transition. Generally, source MAC learning of client devices receiving multicast traffic is updated through periodic membership queries, for example Internet Group Management Protocol (IGMP) queries.

The IGMP is a communications protocol used by end hosts and switches/routers on IPv4 networks to establish multicast group memberships. IGMP allows the network to direct multicast transmissions specifically to end hosts that have requested them. An end host, such as a client device which is a receiver of multicast traffic, may request membership to the multicast group through its local switch/router. The switch/router listens for these requests from the end hosts and periodically sends out membership queries. In an example, a single router per subnet may be elected to send out the membership queries. The router elected to send the periodic membership queries may be referred to as an IGMP querier. The membership queries are periodically sent by the IGMP querier to determine which multicast addresses are of interest to end hosts (clients) attached to the network(s) it serves in order to refresh the group membership state for all the end hosts on its network. In an example, one of the first or second access switch may be designated as an IGMP querier. The IGMP querier may send periodic membership queries to all client devices connected to the first and second access switches at a fixed interval. The client devices may respond to the membership query by sending IGMP join messages and thereby membership of the client devices in the multicast group and MAC learnings of the access switches may be updated. Thus, using this technique of IGMP queries, location information of the client device transitioning from the first WAP to the second WAP may be updated in the access switches through periodic IGMP queries at the fixed interval. However, as the location information is updated periodically based on the IGMP queries, location information of the client device transitioning from the first WAP to the second WAP may not be updated in the access switches immediately after the transition until the periodic IGMP query occurs. Thus, for an intermediate time from an instance when the transition occurs until the next periodic IGMP query, the access switches may not be aware of the updated location information of the client device and thereby may be unable to forward the multicast traffic to the client device via the appropriate switches/routers, consequently resulting in traffic drops at the client device. The traffic drops in the client device for the intermediate time until the location information of the client device is updated in the second access switch may result in degraded network performance.

Further, these traffic drops may be more significant when fast roaming techniques are implemented in the first and second WAPs. Fast roaming, also referred to as IEEE 802.11r or Fast Basic Service Set (BSS) Transition, allows a client device to roam quickly in environments implementing Wi-Fi Protected Access (WPA) Enterprise security, by ensuring that the client device does not need to re-authenticate every time it roams from one WAP to another. Thus, fast roaming techniques are aimed at lowering traffic drops when a client device transitions between WAPs. However, even with fast roaming techniques, traffic flow to the client device receiving multicast traffic may be hindered, because the multicast traffic flow path may not be immediately configured in the second access switch connected to the second WAP to which the client device has transitioned. Thus, traffic drops in the intermediate time may counteract the efficiencies of fast roaming.

Techniques discussed herein may enable quick re-establishment of multicast traffic paths when a client roams across WAPs connected to different wired network devices, such as access switches. Although, in the description hereinafter, the proposed techniques are described with reference to actions performed by a switch, the discussed actions may be performed by any other wired network devices, such as routers, gateways, etc. In an example, a plurality of switches in a single broadcast domain is disclosed. The switches may constitute an access layer of a computing network and may function as network attachment points for WAPs. WAPs may be connected to the switches via physical links. In an example, a common VLAN may be configured in a port of each of the switches. A first switch may be connected to a first WAP and a second switch may be connected to a second WAP. A client device intending to receive multicast traffic of a multicast group may associate with the first WAP. In order to receive the multicast traffic, the client device may generate a first join message, such as an IGMP join message, indicative of a request of the client device to join the multicast group. The first switch may forward the first join message to all switches on the broadcast domain. The second switch may receive the first join message via the broadcast domain. Based on the first join message, the second switch may create an entry corresponding to the client device in a remote receiver record of the second switch. The remote receiver record is indicative of information identifying remote clients and multicast group memberships for the remote clients. The remote clients are client devices associated with WAPs connected to other switches, such as the first switch, in the broadcast domain. The entry is indicative of an intent of the client device to join the multicast group. In an example, the entry may include a network identifier of the broadcast domain, a network address of the client device, and a media access control (MAC) address of the client device linked to a network address of the multicast group.

Subsequently, the client device may roam and transition from the first WAP to the second WAP. In response to the client device transitioning from the first WAP to the second WAP, the second switch may determine that the client device is locally connected to it. Since, the second switch maintains the remote receiver record of remote clients, the second switch may identify that the client device intends to receive multicast traffic of the multicast group based on the entry in the remote receiver record.

When the second switch discovers that the client device is locally connected and that the client device is interested to receive multicast traffic of the multicast group, the second switch generates a second join message directed to the multicast group based on information in the remote receiver record. The second switch may also distribute the second join message in the broadcast domain. Generation and distribution of the second join message to network devices in the broadcast domain updates location information of the client device in all switches in the broadcast domain. Thus, switches in the broadcast domain become aware of the client device now being locally connected to the second switch. Once the location information of the client device is updated in the access switches in the broadcast domain, the second switch may configure a traffic flow path for the multicast traffic of the multicast group via the second switch and the second WAP to the client device. Thus, the second switch is not required to wait for a periodic IGMP query to occur for updating the location information of the client device. Rather, with the present techniques, on identifying that the client device is locally connected, the second switch generates the second join message based on the remote receiver record and using the second join message the second switch can configure the updated traffic flow path for the multicast traffic to the client device. Since, the traffic flow path is configured without depending on the periodic IGMP query, the traffic drop otherwise occurring in the intermediate time from the instance of transition to the instance of a periodic IGMP query may be reduced/eliminated.

The described systems and methods may be implemented in various switches implementing multicast traffic transmission in the communication network. Although, the description above is with reference to access switches, the methods and described techniques may be implemented in other type of switches implementing different communication techniques, albeit with a few variations. Various implementations of the present subject matter have been described below by referring to several examples.

The above systems and methods are further described with reference to FIG. 1A to FIG. 4. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Figure 1A:
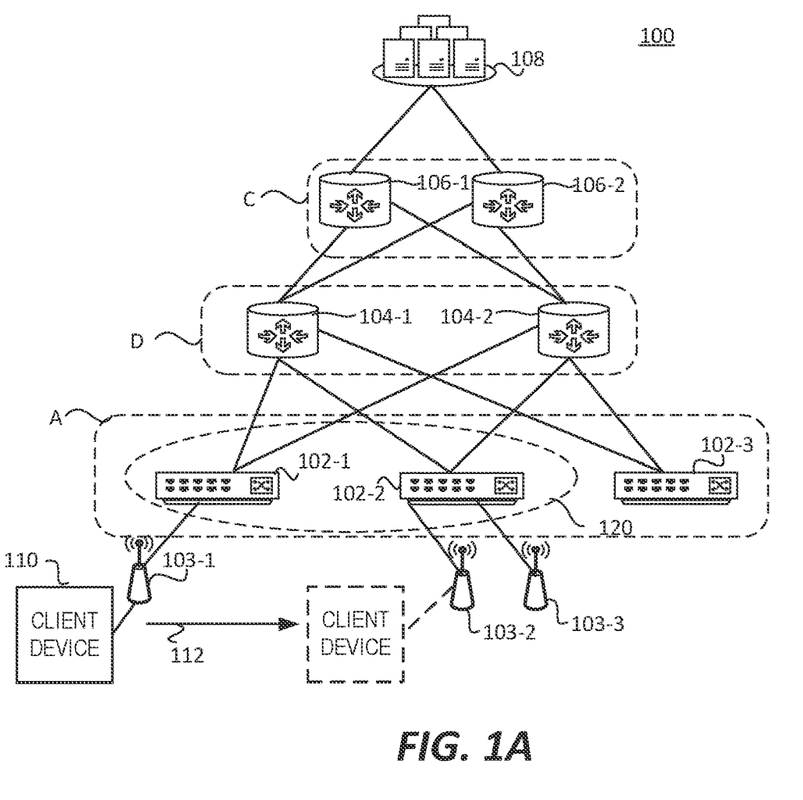
FIG. 1A schematically illustrates a computing network, implementing a wired network device for handling multicast traffic delivery to a client device roaming across WAPs, according to an example.

FIG. 1A schematically illustrates a computing network 100, according to an example of the present subject matter. The computing network 100 may be, for example, a public distributed environment, a private closed computing environment, etc. The computing network 100 may be implemented for an organization, such as a business, educational institution, governmental entity, healthcare facility or other organization. This diagram illustrates an example of a configuration implemented with an organization having multiple users (or at least multiple client devices). The computing network 100 may be implemented at a geographical site which may include a primary network, which can be, for example, an office network, home network or other network installation. The primary network may be a private network, such as a network that may include security and access controls to restrict access to authorized users of the private network. Authorized users may include, for example, employees of a company at the geographical site, residents of a house, customers at a business, and so on. In an example, the computing network 100 is a campus area network (CAN).

According to an example of the present subject matter, the computing network 100 may include an access layer A, a distribution layer D, and a core layer C, as shown in FIG. 1. The access layer A may implement a plurality of wired network devices, such as switch 102-1, switch 102-2, and switch 102-3. For ease of explanation, the switch 102-1, the switch 102-2, and the switch 102-3, are commonly referred to as switches 102, hereinafter. Further, although the terms switch and network device may have been used interchangeably in the description, however, network device may include routers, gateways, and other devices for routing and traffic forwarding. Each switch 102 may provide connectivity between one or more access switches/hosts. The switch 102 may be implemented as, but not limited to, an access layer switching unit, a switch-router, or any device capable of switching data packets at the access layer A and provide connectivity between devices in the distribution layer D and the client devices and between the client devices.

Each switch 102, may connect to one or more WAPs. As shown in FIG. 1, switch 102-1 is connected to WAP 103-1 and switch 102-2 is connected to WAPs 103-2 and 103-3. WAP 103-1, WAPs 103-2 and 103-3 are collectively referred as WAPs 103. Each of the switches 102 are access switches and facilitate host devices to connect to the computing network 100. Each of the switches 102 include multiple ports. In an example, a network administrator may designate a port in a switch 102 as a network port or a wireless access port. The network port acts as an interface between the switch 102 and network devices in upper layers, such as the distribution layer D. The wireless access port acts as an interface between the switches 102 and WAPs 103, connected to the switches 102.

WAPs 103, are included as examples of point of access to the computing network 100 for wireless client devices, such as the client device 110. The WAPs 103 may control network access of the client device 110 and may authenticate the client device 110 for connecting to the WAPs 103 and through the WAPs 103, to other devices within the computing network 100. Each of WAPs 103 may be a combination of hardware, software, and/or firmware that is configured to provide wireless network connectivity to wireless client devices. In the illustrated example, WAPs 103 may be implemented in a distributed WLAN architecture, where the WAPs 103 provide independent distributed intelligence but work together as a system to cooperatively provide control mechanisms.

Switches 102-1 and 102-2 are configured in a single broadcast domain. A broadcast domain may be understood as a logical division of a computer network, in which all nodes can reach each other by broadcast at the data link layer. A broadcast refers to transmission of a data packet to every device on a network. A broadcast domain may be within the same LAN segment or it can be bridged to other LAN segments. In an example, a single VLAN 120, is configured in the switches 102-1 and 102-2. For example, a common VLAN identifier may be configured for one of the wireless access ports in each of the switches 102-1 and 102-2.

The distribution layer D includes network devices 104-1 and 104-2 for managing connectivity between the wired network devices 102 in the access layer A and the core layer C. The core layer C may include network devices 106-1 and 106-2. Examples of the network devices 106-1 and 106-2 may include a router, a layer 3 switch, etc. The network devices 106-1 and 106-2 connect the devices in the distribution and access layers with a datacenter 108. The datacenter 108 may connect with one or more devices in an external network or the Internet.

Figure 1B:
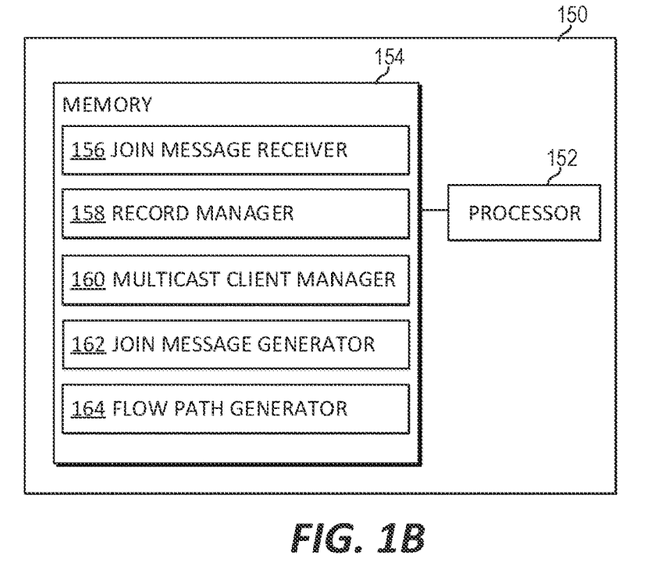
FIG. 1B is a block diagram of an example wired network device for handling multicast traffic delivery to a client device roaming across WAPs, according to an example.

Turning now to FIG. 1B an example network device 150 is shown. The network device 150 may be similar to one or more of the wired network devices illustrated in FIG. 1A, such as the switch 102-1, switch 102-2, and switch 102-3 in the access layer A. Network device 150 may include a processor 152 and a memory 154 that may be coupled to each other through a communication link (e.g., a bus). Processor 152 may include a single or multiple Central Processing Units (CPU) or another suitable hardware processor(s), such as a network ASIC. Memory 154 may be a machine-readable storage medium that may store machine readable instructions executed by processor 152. Memory 154 may include any suitable combination of volatile and/or non-volatile memory, such as combinations of Random Access Memory (RAM), Read-Only Memory (ROM), flash memory, and/or other suitable memory.

Memory 154 stores instructions to be executed by processor 152 including instructions for join message receiver 156, record manager 158, multicast client manager 160, join message generator 162, and flow path generator 164.

Processor 152 may execute join message receiver 160 to receive a first join message originating from a client device. In an example, the first join message may be an IGMP join message originating from a client device associated with a WAP connected to another wired network device in the same broadcast domain as that of the network device 150. In an example, the network device 150 and the other network device may be configured in a common VLAN. The first join message may be forwarded on the broadcast domain, such as the common VLAB, by the other wired network device. The first join message indicates a request from the client device to join a multicast group.

Processor 152 may execute record manager 158 to create, based on the first join message, an entry corresponding to the client device in a remote receiver record of the network device 150. The entry is indicative of an intent of the client device to join the multicast group. In an example, the entry includes a network identifier of the broadcast domain, such as a VLAN identifier, a network address of the client device, such as IP address of the client device, and a MAC address of the client device linked to a network address of the multicast group. The network address of the multicast group refers to an IP address corresponding to the group of devices in the multicast group.

In response to the client device transitioning from the first WAP to a second WAP connected to the network device 150, processor 152 may execute record manager 158 to determine that the client device is locally connected to the network device 150. Processor 152 may execute multicast client manager 160 to identify, based on the entry in the remote receiver record, that the client device on the broadcast domain intends to receive multicast traffic of the multicast group. On identifying that the client device intending to receiving the multicast traffic is locally connected to the network device 150, the processor 152 may execute join message generator 162 to generate, based on the network address of the client device, a second join message directed to the network address of the multicast group and distribute the second join message in the broadcast domain. Processor 152 may execute flow path generator 164 to configure, based on the second join message, a traffic flow path for the multicast traffic of the multicast group via the network device 150 and the second WAP to the client device.

Turning again to FIG. 1A, the client device 110 may send a request to associate with the WAP 103-1. The client device 110 may be a wireless client device with capabilities to connect with WAPs. Examples of the client device 110 may include a laptop, smartphone, tablet, etc. The WAP 103-1 authenticates the client device 110 based on the request and upon successful authentication associates with the client device 110. In an example, the client device may be a receiver of multicast traffic. A multicast is a group communication protocol where data transmission is addressed to a group of destination devices simultaneously. The group to which the data traffic is destined may be referred to as a multicast group. The multicast group may include host devices, such as the client device 110, which are the receivers of the multicast traffic. The multicast group may be allotted a network address. In an example, the network address may be an IP address of the multicast group and the multicast group may be reachable over an IP network. The source of the multicast traffic may be located in the datacenter 108. In another example, the datacenter 108 may receive the multicast traffic from an external network.

Further, each of the switches 102 may include a local receiver record. The local receiver record may include information relating to multicast group membership of client devices connected to the switch. For example, when the client device 110 is associated with the WAP 103-1, a local receiver record of the switch 102-1 includes information relating to MAC address of the client device 110 associated with an IP address of the multicast group. In response to determining that the client device 110 has associated with one of the WAPs connected to its wireless access ports, the switch 102-1 may update its local receiver record to include the client device 110.

When the client device 110 associated with WAP 103-1 intends to receive the multicast traffic, the client device 110 may send a join message to the network address of the multicast group. In an example, the join message may be an Internet Group Management Protocol (IGMP) join message requesting multicast traffic. The IGMP is a communications protocol used by hosts and adjacent routers on IPv4 networks to establish multicast group memberships. IGMP is an integral part of IP multicast and allows the network to direct multicast transmissions to hosts that have requested them. IGMP allows several host devices to share one IP address so they can all receive the same data. IGMP allows devices to join/leave a multicast group. In some examples, the join message may be a request to join the multicast group based on a Multicast Listener Discovery (MLD) Protocol. MLD is a component of the IPv6 suite. MLD may be used by IPv6 routers for discovering multicast listeners (receivers) on a directly attached link. The join message may be referred to as a first join message. The first join message generated by the client device 110 reaches the switch 102-1 via WAP 103-1. The switch 102-1 may forward the first join message to the network address of the multicast group. Further, the switch 102-1 also forwards the first join message over the broadcast domain 120.

Based on the first join message, the client device 110 joins the multicast group. In response to the client device 110 joining the multicast group, the client device 110 may receive the multicast traffic via a first multicast path, say path 1. In an example, the path 1 may originate from a source of the traffic, for example in the data center 108, via the core and distribution layers C and D to the wired network device 102-1 to WAP A1 and the client device 110. Thus, the path 1 may be indicated as Datacentre 108→Core layer C→Distribution layer D→Network device 102-1→WAP A1→Client device 110.

Since the switch 102-2 is also configured on an identical broadcast domain 120, as that of the switch 102-1, the first join message forwarded on the broadcast domain 120 may reach a network port of the switch 102-2. Thus, join message receiver 156 of the switch 102-2 may receive the first join message originating from the client device 110. In response to receiving the first join message, record manager 158 of the switch 102-2 may create an entry corresponding to the client device in a remote receiver record of the switch 102-2. The remote receiver record of the switch 102-2 includes information relating to multicast group membership of client devices connected to other wired network devices, such as switch 102-1, in the same broadcast domain 120. In an example, the switch 102-2 may update its remote receiver record based on join or leave messages arriving over its network ports. Although, the remote receiver record and the functionalities hereinafter are described with reference to the switch 102-2, each of the switched 102-1 and 102-3 may also include respective remote receiver records and may perform the functionalities explained with reference to switch 102-2.

The entry created in the remote receiver record of the switch 102-2 may include a network identifier of the broadcast domain, a network address of the client device 110, and a media access control (MAC) address of the client device 110 linked to a network address of the multicast group. An example remote receiver record is shown in table 1 below.

TABLE 1

| Client's MAC and VLAN | Client's IP | Multicast group address |
| --- | --- | --- |
| Client device 110's MAC on broadcast domain 120 | Client device 110's IP address | 235.10.10.10 |

As shown in table 1, the remote receiver record may include a table identifying the MAC address of the client device 110, an IP address of the client device 110, and an IP address of the multicast group. Thus, the entry corresponding to the client device 110 in the remote receiver record of the switch 102-2 is indicative of an intent of the client device 110 to join the multicast group. Another table similar to table 1 may be included in the local receiver record of the switch 102-1, when the client device 110 is connected to WAP A1.

Consider that the client device 110 roams out of a range of the WAP 103-1 and transitions into a range of the WAP 103-2, as denoted by arrow 112. With reference to FIG. 1, the client device 110 shown with dashed lines depict the new position of the client device 110 when it roams from WAP 103-1 to WAP 103-2. In an example, a user of the client device 110 may move from one floor of the building to another floor of the building which may cause the client device 110 to roam from WAP 103-1 to WAP 103-2. Once the client device 110 roams from WAP 103-1 to WAP 103-2, the client device 110 may send a request to associate with the WAP 103-2. In an example, WAP 103-2 may authenticate the client device 110 and associate with the same. In some other examples, the client device 110 may be roaming using fast roaming techniques and may instantly associate with the WAP 103-2 once it roams away from the range of the WAP 103-1 and transitions into the range of the WAP 103-2. Fast roaming, also referred to as IEEE 802.11r or Fast BSS Transition (FT), allows a client device to roam quickly in environments implementing WPA2 Enterprise security, such that the client device does not need to re-authenticate to an authentication server, such as a Remote Authentication Dial-In User Service (RADIUS) server, every time it roams from one WAP to another. In an example, with fast roaming, after the client device connects to the WAP 103-1, the WAP 103-1 identifies the client device 110 as an authenticated device for all APs in the broadcast domain, such as 120 of FIG. 1. When a client device roams to a new WAP, information from the original association is passed to the new WAP to provide the client device with credentials. The new WAP therefore knows that the client device has already been approved by the authentication server, and thus need not repeat the whole authentication process which enables faster/instant association with the new WAP.

In response to the client device 110 transitioning from the WAP 103-1 to WAP 103-2 connected to the switch 102-2 and associating with the WAP 103-2, multicast client manager 160 of the switch 102-2 may determine that the client device 110 is locally connected to the wired network device 102-2. A client device locally connected to a switch may be understood as the client device being associated with a WAP connected to the switch. In an example, multicast client manager 160 of the switch 102-2 may scan wireless access ports of the switch 102-2 and based on MAC learnings of the WAP 103-2 may determine that the client device 110 is locally connected to the switch 102-2. On determining that the client device 110 is locally connected to the switch 102-2, multicast client manager 160 of the switch 102-2 may search its remote receiver record using the MAC address of the client device 110 and VLAN identifier of broadcast domain 120.

Based on the search, multicast client manager 160 of the switch 102-2 may discover the entry corresponding to the client device 110 in the remote receiver record. In an example, from the information in the entry, the multicast client manager 160 of the switch 102-2 may identify that the client device 110 on the broadcast domain 120, intends to receive multicast traffic of the multicast group having multicast address, say, 235.10.10.10. The IP address 235.10.10.10 of the multicast group, as mentioned herein, is provided by way of an example. In other examples, the address of the multicast group may be denoted by an IP address within the multicast address range 224.0.0.0 through 239,255,255.255. In response to determining that the client device 110 intends to receive traffic of the multicast group, join message generator 162 of the switch 102-2 may generate a second join message directed to the network address (such as IP address) of the multicast group. In an example, the second join message is an IGMP join message generated by the switch 102-2 on behalf of the client device 110. Since, the IGMP join message is an IP packet, the join message generator 162 generates the same using the IP address of the client device 110. Thus, join message generator 162 of the switch 102-2 generates a second join message based on the network address of the client device, where the second join message is directed to the network address of the multicast group.

Join message generator 162 of the switch 102-2 may distribute the second join message to the wired network devices, such as switches 102, in the broadcast domain 120. The switch 102-1, to which the client device 110 was previously connected before roaming, may receive the second join message at its network port. In response to the switch 102-1 receiving the second join message from the broadcast domain, record manager 158 of the switch 102-1 may create an entry corresponding to the client device 110 in a remote receiver record of the switch 102-1. The entry in the remote receiver record of the switch 102-1 is similar to the entry, as shown in table 1. The entry corresponding to the client device 110 in the remote receiver record of the switch 102-1 is indicative of an intent of the client device 110 to join the multicast group. In response to the switch 102-1 receiving the second join message, the switch 102-1 may remove the entry corresponding to client device 110 from its local receiver record, since the client device 110 is now locally connected to a different network device, viz., switch 102-2.

Responsive to sending the second join message to the broadcast domain, record manager 158 of the switch 102-2 may delete the entry from its remote receiver record since the client device 110 is now locally connected to the switch 102-2. Further, in another example, join message generator 162 of the network device 102-2 may generate a Protocol Independent Multicast (PIM) join request. When a receiving device, such as the switch 102-2, requires multicast data, the receiver's designated router sends the PIM join message to instruct the upstream neighbors, such as network devices in the distribution layer D and the core layer C, to forward packets to the receiver, i.e., the switch 102-2 in this case. In an example, the PIM join message is sent in the upstream direction hop by hop. PIM is a group of multicast routing protocols for IP networks that provide one-to-many and many-to-many distribution of data over a LAN, WAN or the Internet. The PIM join request may be referred to as a third join request.

After sending the second join message, flow path generator 164 of the switch 102-2 may configure a traffic flow path for the multicast traffic of the multicast group via the switch 102-2 and the WAP 103-2 to the client device 110. In an example, the flow path generator 164 may set up a second multicast path (path 2), based on the second join message in the switch 102-2. The path 2 may originate from the source of the traffic in the data center 108 via the core and distribution layers D and C to the switch 102-2 and to client device 110 via WAP 103-2. The path 2 may be indicated as Data center 108→Core layer C→Distribution layer D→Switch 102-2→WAP 103-2→client device 110. Thus, as explained above, once the client device 110 transitions from the switch 102-1 to switch 102-2, the path for multicast traffic directed to client device 110 is also switched from path 1 to path 2 which enables seamless delivery of multicast traffic to the client device 110 even after the client device 110 roams from WAP 103-1 to WAP 103-2 while receiving the multicast traffic. Because, flow path generator 164 configures the second multicast path based on the second join message once the client device 110 transitions from the first WAP 103-1 to the second WAP 103-2, the client device 110 is not required to wait until the subsequent periodic IGMP query for its location information to be updated in the switch 102-2 connected to the second WAP 103-2. Once the second multicast path is configured in the switch 102-2, the switch 102-2 may receive and forward the multicast traffic to the client device 110 along the configured traffic flow path, i.e, path 2 thereby enabling seamless mobility for the client device.

FIG. 2 is a flowchart illustrating a method 200 for handling multicast traffic delivery to a client device roaming across WAPs, according to an example. Method 200 may be executed on a wired network device, such as the switch 102-2 in an access layer A of a computing environment 100 FIG. 1.

At block 202, a wired network device may receive a first join message originating from a client device. The client device may be associated with a first wireless access point (WAP) connected to another wired network device from a plurality of network devices in a broadcast domain, where the wired network device is included in the broadcast domain. The first join message may be forwarded on the broadcast domain by the other wired network device. The first join message may be indicative of a request of the client device to join a multicast group.

At block 204, the wired network device creates an entry corresponding to the client device in a remote receiver record of the wired network device. The entry may be created based on the first join message. The entry may be indicative of an intent of the client device to join the multicast group. In an example, the entry includes a network identifier of the broadcast domain, a network address of the client device, and a MAC address of the client device linked to a network address of the multicast group.

At block 206, in response to the client device transitioning from the first WAP to a second WAP connected to the wired network device, the wired network device searches the remote receiver record using the network identifier of the broadcast domain and the MAC address of the client device. At block 208, based on the search, the wired network device may identify, that the client device on the broadcast domain intends to receive multicast traffic of the multicast group.

At block 210, the wired network device may generate, based on the network address of the client device, a second join message directed to the network address of the multicast group. At block 212, the wired network device may distribute the second join message to the plurality of wired network devices in the broadcast domain. At block 214, the wired network device may configure, based on the second join message, a traffic flow path for the multicast traffic of the multicast group via the wired network device and the second WAP to the client device.

Figure 3:
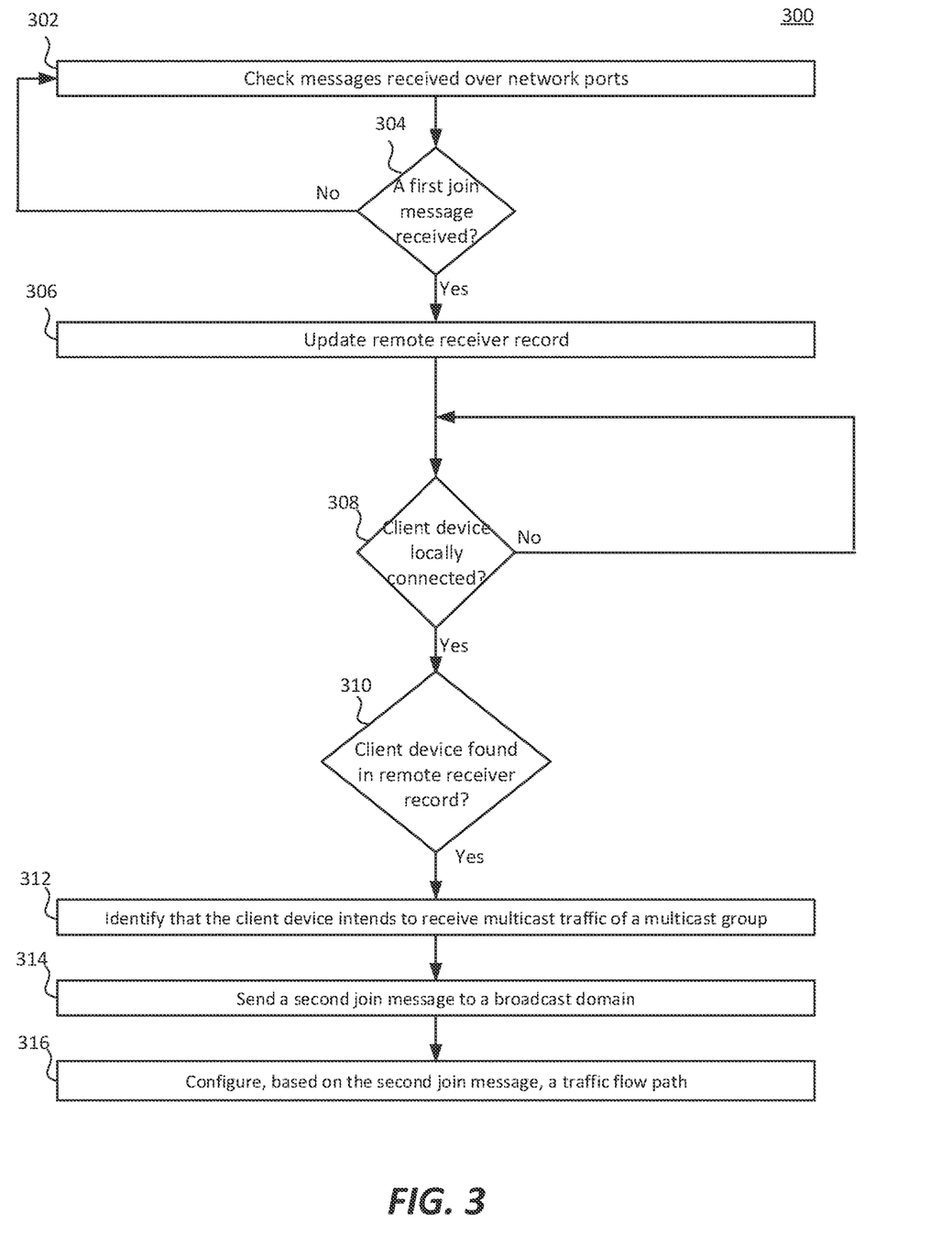
FIG. 3 is a flowchart illustrating a method for handling multicast traffic delivery to a client device roaming across WAPs, according to an example.

FIG. 3 is a flowchart illustrating a method 300 for handling multicast traffic delivery to a client device roaming across WAPs, according to an example. Method 300 may be executed on a wired network device, such as the switch 102-2 in an access layer A of a computing environment 100 FIG. 1.

At block 302, a first switch checks for messages received over its network ports. The network port acts as an interface between the first switch and network devices in upper layers, such as a distribution layer or core layer. In an example, the first switch may receive a first join message at the network port, at block 304. The first join message may originate from a client device associated with a WAP connected to a second switch configured in an identical broadcast domain as that of the first switch. The first join message may be forwarded on the broadcast domain by the second switch. The first join message may be indicative of a request of the client device to join a multicast group. In an example, the first join message may be an IGMP join message. In an example, the first and second switches may be configured in a single VLAN. Thus, messages broadcasted on the VLAN may be received by all network devices in the VLAN.

In response to receiving the first join message ('Yes' branch from block 304), the first switch may update a remote receiver record stored therein, at block 306. The remote receiver record may be indicative of information identifying remote clients and multicast group memberships for the remote clients. The remote clients are client devices associated with WAPs connected to other switches, such as the second switch, in the broadcast domain. In an example, updating the remote receiver record may include creating an entry corresponding to the client device in the remote receiver record. The entry may be indicative of an intent of the client device to join the multicast group. In an example, the entry may include a network identifier of the broadcast domain, a network address of the client device, and a media access control (MAC) address of the client device linked to a network address of the multicast group.

The client device may roam across and transition from a WAP connected to the second switch to a WAP connected to the first switch. At block 308, the first switch checks whether the client device is locally connected to it. In an example, the first switch may check MAC learnings of WAPs connected to its wireless access ports. The wireless access port acts as an interface between the first switch and wireless access points connected to it. In an example, the first switch may scan its wireless access ports and based on MAC learnings of WAPs connected to its wireless access ports, the first switch may determine that the client device is locally connected to it. On determining that the client device is locally connected to the it, the first switch may check its remote receiver record, at block 310.

Based on the check, the first switch may find the client device in the remote receiver record ('Yes' branch from block 310). Based on the entry corresponding to the client device in the remote receiver record, at block 312, the first switch may identify that the client device intends to receive multicast traffic of the multicast group as mentioned in the remote receiver record. In response to determining that the client device intends to receive traffic of the multicast group, the first switch may send a second join message directed to the network address (such as IP address) of the multicast group, at block 314. The second join message may be received by other wired client devices (including the second switch) in the broadcast domain over respective network ports. The second join message may be indicative to the other network devices in the broadcast domain that the client device is now locally connected to the first switch. At block 316, the first switch configures a traffic flow path for the multicast traffic based on the second join message.

Figure 4:
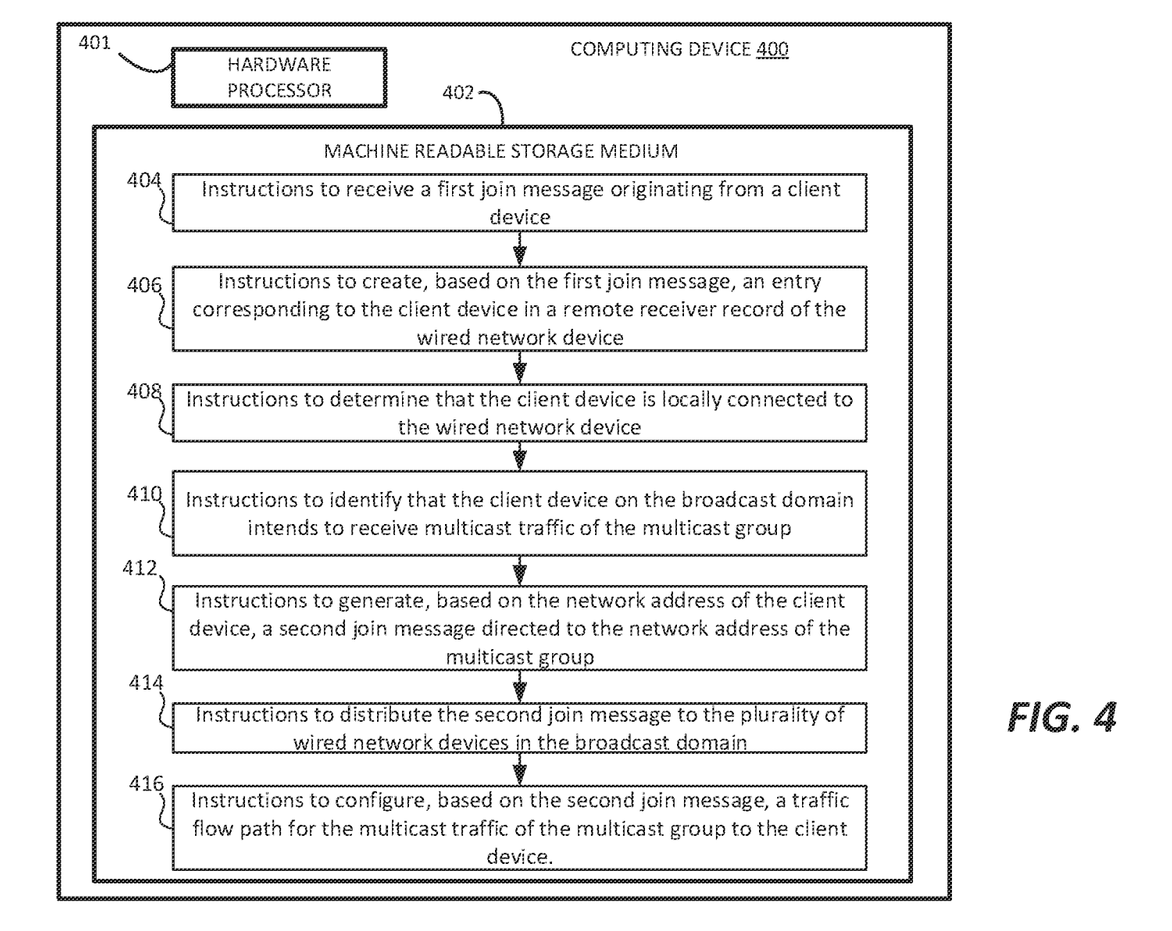
FIG. 4 illustrates a computing device for implementing the method for handling multicast traffic delivery to a client device roaming across WAPs, according an example.

FIG. 4 is an example computing device 400, with a hardware processor 401, and accessible machine-readable instructions stored on a machine-readable medium 402 for implementing one example system, according to one or more disclosed example implementations. In an example, the computing device 400 may be a network device, such as the access switch 102, described above in reference to FIG. 1. FIG. 4 illustrates computing device 400 configured to perform instructions 402-416 described below. However, computing device 400 may also be configured to perform the flow of other methods, techniques, functions, or processes described in this disclosure, such as, for example the method 200 of FIG. 2.

A processing element such as processor 401 may contain one or more hardware processors, where each hardware processor may have a single or multiple processor cores. In one embodiment, the processor 401 may include at least one shared cache that stores data (e.g., computing instructions) that are utilized by one or more other components of processor 401. For example, the shared cache may be a locally cached data stored in a memory for faster access by components of the processing elements that make up processor 401. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 4, the processing elements that make up processor 401 may also include one or more of other types of hardware processing components, such as graphics processing units (GPU), application specific integrated circuits (ASICs), field-programmable gate arrays (FPGAs), and/or digital signal processors (DSPs).

The processor 401 may be operatively and communicatively coupled to a memory. The memory may be a non-transitory computer readable medium, such as the machine readable storage medium 402, configured to store various types of data. For example, the memory may include one or more storage devices that comprise a non-volatile storage device and/or volatile memory. Volatile memory, such as random-access memory (RAM), can be any suitable non-permanent storage device. The non-volatile storage devices can include one or more disk drives, optical drives, solid-state drives (SSDs), tap drives, flash memory, read only memory (ROM), and/or any other type of memory designed to maintain data for a duration of time after a power loss or shut down operation. In certain aspects, the non-volatile storage devices may be used to store overflow data if allocated RAM is not large enough to hold all working data. The non-volatile storage devices may also be used to store programs that are loaded into the RAM when such programs are selected for execution.

The machine-readable storage medium 402 of FIG. 4, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

The machine readable medium 402 includes instructions 404 that, when executed by the processor 401, cause a network device to receive a first join message originating from a client device associated with a first WAP connected to another wired network device from a plurality of network devices in a broadcast domain. The first join message may be forwarded on the broadcast domain by the other wired network device. The first join message may be indicative of a request of the client device to join a multicast group. The instructions 406, when executed by the processor 401, cause the network device to create an entry corresponding to the client device in a remote receiver record of the wired network device, based on the first join message. The remote receiver record may be indicative of information identifying remote clients and multicast group memberships for the remote clients. The remote clients are client devices associated with WAPs connected to other wired network devices in the broadcast domain. The entry may be indicative of an intent of the client device to join the multicast group. In an example, the entry may include a network identifier of the broadcast domain, a network address of the client device, and a media access control (MAC) address of the client device linked to a network address of the multicast group. In response to the client device transitioning from the first AP to a second WAP connected to the wired network device, the instructions 408, when executed by the processor 401, cause the wired network device to determine that the client device is locally connected to the wired network device. The instructions 410, when executed by the processor 401, cause the wired network device to identify that the client device on the broadcast domain intends to receive multicast traffic of the multicast group. The instructions 412, when executed by the processor 401, cause the wired network device to generate a second join message directed to the network address of the multicast group, based on the network address of the client device. The instructions 414, when executed by the processor 401, cause the wired network device to distribute the second join message to the wired network devices in the broadcast domain. The instructions 416, when executed by the processor 401, cause the wired network device to configure a traffic flow path for the multicast traffic of the multicast group via the wired network device and the second WAP to the client device.

A network device as used in the examples herein, is a device that receives network traffic and forwards the network traffic to a destination. Network devices may include, among other devices, switches, routers, bridges, and gateways. Some network devices execute packets services, such as application classification and deep packet inspection, on certain network traffic that is received at the network device. Some network devices monitor load parameters for various physical and logical resources of the network device, and report load information to a network orchestrator or an orchestrator.

A switch, as used in the examples herein, forwards data (in control packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

Examples of client devices, as used herein, may include: laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ". Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

We claim:

1. A wired network device comprising:
   a processor; and
   a non-transitory, computer-readable medium including instructions that, when executed by the processor, cause the wired network device to:
   receive a first join message originating from a client device, wherein the client device is associated with a first wireless access point (WAP) connected to another wired network device, wherein the wired network device and the other wired network device is configured in a broadcast domain and the first join message is forwarded on the broadcast domain by the other wired network device, wherein the first join message is indicative of a request of the client device to join a multicast group;
   create, based on the first join message, an entry corresponding to the client device in a remote receiver record of the wired network device, wherein the entry is indicative of an intent of the client device to join the multicast group, the entry including a network identifier of the broadcast domain, a network address of the client device, and a media access control (MAC) address of the client device linked to a network address of the multicast group;
   in response to the client device transitioning from the first WAP to a second WAP connected to the wired network device, determine that the client device is locally connected to the wired network device;
   identify, based on the entry in the remote receiver record, that the client device on the broadcast domain intends to receive multicast traffic of the multicast group;
   generate, based on the network address of the client device, a second join message directed to the network address of the multicast group;
   distribute the second join message in the broadcast domain; and
   configure, based on the second join message, a traffic flow path for the multicast traffic of the multicast group via the wired network device and the second WAP to the client device.

2. The wired network device of claim 1, further comprising instructions that, when executed by the processor, cause the wired network device to:
   generate a third join message on behalf of the client device, wherein the third join message is a Protocol Independent Multicast (PIM) join request; and
   forward the third join message to an upstream network device routing traffic to the broadcast domain.

3. The wired network device of claim 1, further comprising instructions that, when executed by the processor, cause the wired network device to forward the multicast traffic to the client device along the configured traffic flow path.

4. The wired network device of claim 1, wherein in response to the other network device receiving the second join message from the broadcast domain, the entry is created in a remote receiver record of the other network device.

5. The wired network device of claim 1, wherein, in response to the other network device receiving the second join message from the broadcast domain, an entry corresponding to the client device is deleted from a local receiver record of the other network device.

6. The wired network device of claim 1, further comprising instructions that, when executed by the processor, cause the network device to delete the entry from the remote receiver record of the network device, responsive to sending the second join message.

7. The wired network device of claim 1, wherein the first join message is received over a network port of the wired network device.

8. The wired network device of claim 1, wherein the client device transitions between the first WAP and second WAP using fast roaming.

9. The wired network device of claim 1, wherein the first join message and the second join message are IGMP join requests.

10. The wired network device of claim 1, wherein the first WAP and the second WAP are deployed in a distributed WLAN architecture.

11. The wired network device of claim 1, wherein the wired network device and the other wired network device is deployed in an access layer of a computing network.

12. A method comprising:
receiving, by a wired network device, a first join message originating from a client device, wherein the client device is associated with a first wireless access point (WAP) connected to another wired network device, wherein the wired network device and the other wired network device is configured in a broadcast domain and the first join message is forwarded on the broadcast domain by the other wired network device, wherein the first join message is indicative of a request of the client device to join a multicast group;
creating, by the wired network device and based on the first join message, an entry corresponding to the client device in a remote receiver record of the wired network device, wherein the entry is indicative of an intent of the client device to join the multicast group, the entry including a network identifier of the broadcast domain, a network address of the client device, and a media access control (MAC) address of the client device linked to a network address of the multicast group;
in response to the client device transitioning from the first WAP to a second WAP connected to the wired network device determine that the client device is locally connected to the wired network device;
identifying, by the wired network device and based on the entry in the remote receiver record, that the client device on the broadcast domain intends to receive multicast traffic of the multicast group;
generating, by the wired network device and based on the network address of the client device, a second join message directed to the network address of the multicast group;
distributing, by the wired network device, the second join message in the broadcast domain; and
configuring, by the wired network device, based on the second join message, a traffic flow path for the multicast traffic of the multicast group via the wired network device and the second WAP to the client device.

13. The method of claim 12, further comprising:
generating a third join message on behalf of the client device, wherein the third join message is a Protocol Independent Multicast (PIM) join request; and
forwarding the third join message to an upstream network device routing traffic to the broadcast domain.

14. The method of claim 12, further comprising forwarding the multicast traffic to the client device along the configured traffic flow path.

15. The method of claim 12, wherein in response to the other network device receiving the second join message from the broadcast domain, the entry is created in a remote receiver record of the other network device.

16. The method of claim 12, wherein, in response to the other network device receiving the second join message from the broadcast domain, an entry corresponding to the client device is deleted from a local receiver record of the other network device.

17. The method of claim 12, further comprising deleting the entry from the remote receiver record of the network device, responsive to sending the second join message.

18. The method of claim 12, wherein the first join message is received over a network port of the wired network device.

19. A non-transitory, computer readable medium including instructions that, when executed by a processor, cause a wired network device to:
receive a first join message originating from a client device, wherein the client device is associated with a first wireless access point (WAP) connected to another wired network device, wherein the wired network device and the other wired network device is configured in a broadcast domain and the first join message is forwarded on the broadcast domain by the other wired network device, wherein the first join message is indicative of a request of the client device to join a multicast group;
create, based on the first join message, an entry corresponding to the client device in a remote receiver record of the wired network device, wherein the entry is indicative of an intent of the client device to join the multicast group, the entry including a network identifier of the broadcast domain, a network address of the client device, and a media access control (MAC) address of the client device linked to a network address of the multicast group;
in response to the client device transitioning from the first WAP to a second WAP connected to the wired network device, determine that the client device is locally connected to the wired network device;
identify, based on the entry in the remote receiver record, that the client device on the broadcast domain intends to receive multicast traffic of the multicast group;
generate, based on the network address of the client device, a second join message directed to the network address of the multicast group;
distribute the second join message in the broadcast domain; and
configure, based on the second join message, a traffic flow path for the multicast traffic of the multicast group via the wired network device and the second WAP to the client device.

20. The non-transitory computer-readable medium of claim 19, further comprising instructions that, when executed by the processor, cause the network device to:

generate a third join message on behalf of the client device, wherein the third join message is a Protocol Independent Multicast (PIM) join request; and forward the third join message to an upstream network device routing traffic to the broadcast domain.

\* \* \* \* \*